United States Patent [19]

Connor

[11] 4,300,902

[45] Nov. 17, 1981

[54] COLORATION PROCESS

[75] Inventor: Herbert G. Connor, Bacup, England

[73] Assignee: Imperial Chemical Industries Limited, London, England

[21] Appl. No.: 156,795

[22] Filed: Jun. 5, 1980

[30] Foreign Application Priority Data

Jun. 18, 1979 [GB] United Kingdom ............ 21087/79

[51] Int. Cl.³ .............................................. D06P 3/82
[52] U.S. Cl. ............................................ 8/529; 8/532; 8/549; 8/585; 8/688; 8/917; 8/918
[58] Field of Search ................ 8/529, 532, 549, 585, 8/688, 917, 918

[56] References Cited

U.S. PATENT DOCUMENTS

| | | | |
|---|---|---|---|
| 3,791,787 | 2/1974 | Yamada et al. ..................... | 8/576 |
| 4,264,321 | 4/1981 | von der Eltz ........................ | 8/476 |

FOREIGN PATENT DOCUMENTS

| | | |
|---|---|---|
| 927772 | 6/1963 | United Kingdom . |
| 2027754 | 2/1980 | United Kingdom . |
| 2027755 | 2/1980 | United Kingdom . |
| 2027756 | 2/1980 | United Kingdom . |

OTHER PUBLICATIONS

Venkataraman's "The Chemistry of Synthetic Dyes" vol. VI (Academic Press, 1972) pp. 147–151.
Beech, W. F., "Fibre–Reactive Dyes" (Logos Press, London, 1970), pp. 132–135.

*Primary Examiner*—A. Lionel Clingman
*Attorney, Agent, or Firm*—Cushman, Darby & Cushman

[57] ABSTRACT

Process for the coloration of cellulose textile materials which comprises applying a dyestuff containing one or more s-triazinyl groups bearing a quaternary nitrogen substituent, or the precursors of such a dyestuff, in the absence of an acid-binding agent and heating the treated textile material to 150° C. or higher to fix the dyestuff to the cellulose.

Improved coloration is often achieved by applying urea or dicyandiamide with the dyestuff.

The process is particularly valuable for the coloration of cellulose in polyester/cellulose unions when a disperse dye may be applied simultaneously with less problems than encountered with conventional alkali fixed reactive dyes.

7 Claims, No Drawings

COLORATION PROCESS

This invention relates to a colouration process in particular to a process for colouring cellulose and wool textiles.

It is now well-established to colour cellulose with dyestuffs containing groups which are believed to react to form a bond between dyestuff and hydroxyl groups of the cellulose. Many such dyestuffs are available having a wide range of groups capable of reacting with the cellulose such as haloheterocyclic compounds, e.g. fluoro-, chloro and bromo-s-triazinyl, chloro- and fluoro-pyrimidinyl, chloroquinoxaline and chloropyridazine. To obtain good levels of colouration it is usually found necessary to include a treatment with an acid-binding agent in the colouration process. The acid-binding agents are typically sodium bicarbonate, carbonate or hydroxide and are usually associated with an alkaline pH. Fixation is normally achieved at temperatures from 25°–100° C.

Similar reaction can occur between these dyestuffs and amino groups in wool though an alkaline treatment is not usually employed in this instance since it is not necessary to ensure reaction and wool may be adversely affected by the alkaline conditions. Thus it is not usually possible to colour wool/cellulose blends satisfactorily with conventional reactive dyestuffs since each component requires conditions incompatible with those required by the other.

When colouring polyester/cellulose union textiles the two types of fibre require different dyestuffs for their colouration. Clearly it is advantageous if the application of these two different dyestuffs can be achieved by the same processing. Polyesters are usually coloured by disperse dyes using a short high temperature treatment in say the 150°–250° C. temperature range.

Ideally the unions are coloured by applying a single liquor or print paste containing dyes for both fibre types followed by a single heat treatment. A number of problems can arise. In the presence of alkaline materials and other electrolytes, many disperse dyes flocculate or degrade thus making it difficult to apply them with the cellulose dye and its acid-binding agent in a single medium. Also cellulose reactive dyes can become hydrolysed at high temperatures in aqueous media.

It is known, e.g. from U.K. Pat. No. 927,772, to use as cellulose reactive dyes, dyes containing a triazinyl group having a quaternary nitrogen substituent, i.e. a group of the formula:

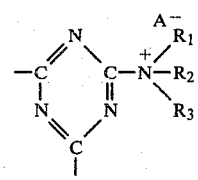

where $A^-$ is an anion, e.g. chloride, and $R_1$, $R_2$ and $R_3$ are substituents such as alkyl or together form part of a ring, e.g.

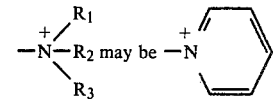

Dyestuffs of this type are readily formed by interaction of a halotriazinyl dye and a tertiary amine (including pyridine compounds and like heterocyclic amines). This interaction is so facile it is often sufficient to include the precursors in a print paste or dye liquor thereby forming the quaternary nitrogen substituted triazinyl due in situ.

We have now found that by careful selection of the conditions it is possible to reactively colour wool and cellulose in good colour yield from print pastes or dye liquor which may also contain disperse dyestuffs without problems such as flocculation or degradation.

According to the present invention there is provided a process for the colouration of cellulose or wool textile materials which comprises applying a dyestuff containing one or more s-triazinyl groups bearing a quaternary nitrogen substituent, or the precursors of such a dyestuff, in the absence of an acid-binding agent and heating the treated textile material to 150° C. or higher to fix the dyestuff to the cellulose or wool.

The term "quaternary nitrogen substituent" has the meaning given above and such dyestuffs are readily formed from dyestuffs containing a halotriazinyl group and a compound containing a tertiary nitrogen atom. Such a combination constitutes the "precursors" mentioned above.

There are many dyestuffs available containing halotriazinyl groups, e.g. the listings in the Colour Index. The halogen is usually chloro or possibly fluoro. Bromotriazinyl dyes can be used but these are not normally commercially available. It is usually preferred that the quaternary nitrogen substituted triazinyl dyestuff has the formula:

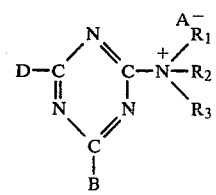

where D is a chromophoric residue usually linked to the triazine nucleus by a NH group, $A^-$, $R_1$, $R_2$ and $R_3$ have the meanings given above and B is a non-reactive substituent, i.e. not reactive towards cellulose substrates.

The group 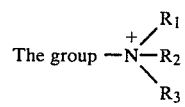

is derived from tertiary amines as described above, either in a separate manufacturing process or in situ in the dye liquor or print paste used in the process of the present invention. As examples of tertiary amines there may be mentioned trimethylamine, triethylene diamine, pyridine, methylpyridines and carboxypyridines. It is often found that the preferred tertiary amines are carboxypyridines of the formula:

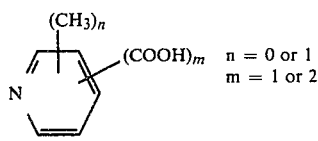

n = 0 or 1
m = 1 or 2

A particularly preferred carboxypyridine is nicotinic acid.

When added as a precursor to the dye liquor or print paste the tertiary amine will usually be in amounts equivalent to the halotriazinyl dyestuff present.

As examples of non-reactive substituents B there may be mentioned alkyl or aryl thio groups, alkoxy or aryloxy groups and optionally substituted amine groups.

Preferred forms of these groups include lower, i.e. $C_{1-4}$alkoxy, e.g. methoxy, ethoxy, n-propoxy and iso-propoxy, butoxy and lower alkoxy lower alkoxy, e.g. β-methoxy-ethoxy, β-ethoxyethoxy, phenoxy and sulphophenoxy; amino; lower alkylamino, e.g. methylamino, ethylamino, butylamino, di(lower alkyl)amino, e.g. dimethylamino, diethylamino, methylethylamino, dibutylamino and groups of the latter two types in which the alkyl groups are substituted, in particular by OH, CN or $SO_3H$, e.g. β-hydroxyethylamino, di(β-hydroxyethyl)amino, β-cyanoethylamino, di(β-cyanoethyl)amino, β-sulphoethylamino, β-hydroxypropylamino, (β-hydroxybutyl)ethylamino and (β-hydroxyethyl)methylamino; cycloalkylamino, e.g. cyclohexylamino; cyclic amino, e.g. morpholino or piperazino; naphthylamino substituted by 1, 2 or 3 $SO_3H$ groups and optionally substituted phenyl amino groups.

As a particularly preferred form of the optionally substituted phenylamino groups there may be mentioned groups of the formula:

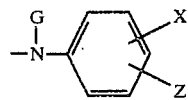

(2)

where G=H, methyl, ethyl, ω-sulphomethyl, β-carboxy-, β-hydroxy or β-cyanoethyl and Z and X are each independently selected from H, COOH, $SO_3H$, $CH_3$, $C_2H_5$, $OCH_3$, $OC_2H_5$, Cl, Br, CN, $NO_2$ $NHCOCH_3$ and β-sulphatoethylsulphonyl.

As specific examples of such groups there may be mentioned anilino, o-, m- and p-sulphoanilino, o-, m- and p-carboxyanilino, 4- and 5-sulpho-2-carboxyanilino, 4- and 5-sulpho-o-tolylamino, 2,4-, 2,5- and 3,5-disulphoanilino, 2,4-dicarboxyanilino, 4- and 5-sulpho-2-methoxyanilino, N-methyl-o-, m- and p-sulphoanilino, N-ω-sulphomethylanilino, N-(β-hydroxyethyl)-3-sulphoanilino.

Alternatively the dyestuff may be derived from halotriazinyl dyes of the form

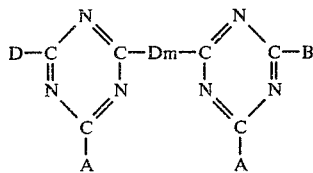

where A, B and D have the meanings given above and Dm is a diamine residue linking the triazine nuclei by its 2-amino groups.

As examples of the diamines $DmH_2$ which may provide the residue Dm there may be mentioned:
heterocyclic diamines, e.g. piperazine,
aliphatic diamines, e.g. alkylene-, hydroxyalkylene- or sulphato alkylene diamines especially those having 2–6 carbon atoms, e.g. ethylene diamine
1,2 and 1,3-propylene diamines
1,6-diaminohexane
β-hydroxyethylaminoethylamine
2-hydroxy-1,3-diaminopropane
2-sulphato-1,3-diaminopropane
other α, ω-diamino aliphatic compounds, e.g.
triethylene tetramine
di-(β-aminoethyl)ether
naphthylene diamine sulphonic acids, e.g.
2,6-diaminonaphthalene-1,5- and 4,8-disulphonic acids
1,5-diaminonaphthalene-3,7-disulphonic acid
and diamine derivatives of mono- and di-cyclic compounds of
the benzene series, e.g. phenylene diamines and their mono- and
disulphonic acids, e.g. m- and p-phenylene diamines
1,3-phenylenediamine-5-sulphonic and 4,6-disulphonic acids
1,4-phenylenediamine-2-sulphonic and 2,5-disulphonic acids
diamines of the formula:

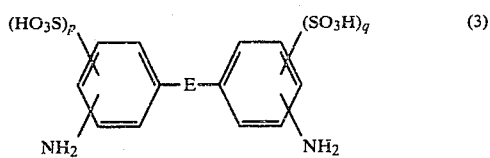

(3)

where p and q are each 0 or 1 and E is a direct link or a group selected from $SO_2$, $OCH_2$, $C_2H_2$, $C_2H_4$, NH, NHCONH, e.g.
4,4'-diaminostilbene-2,2'-disulphonic acid
benzidine-2-sulphonic and 2,2'-disulphonic acids
3,3'- and 4,4'-diaminodiphenylureas
4,4'-diaminodiphenylurea-2,2'- and 3,3'-disulphonic acids
4,4'-diaminodiphenylamine-2,2'-disulphonic acid
4,4'-diaminodiphenylmethane
4,4'-diaminodiphenylmethane-2,2'-disulphonic acid
4,4'-diaminodiphenylether
4,4'-diaminodiphenylsulphone
4,4'-diaminodiphenylethane-2,2'-disulphonic acid
and the N-lower alkyl and N,N'-di(lower alkyl) derivatives of the above diamines, e.g.
4-methylamino and 4-ethylaminoaniline-2-sulphonic acids
N,N'-dimethyl-4,4'-diaminodiphenylamino-2,2'-disulphonic acid.

The dyestuff may be of any known chromophoric type e.g. azine, triphendioxazine, anthraquinone, azo and metallised azo, phthalocyanine or formazon.

The dyestuff or its precursors are usually applied to the textile material from an aqueous medium. This may be in the form of a dye bath through which the textile material is padded or it may be in the form of a print paste. Such print pastes will contain the usual adjuncts, e.g. thickening agents, necessary for successful printing.

The dye liquor or print paste will usually contain from 1 to 10% by weight of the dyestuff.

It is often found convenient to dry the treated textile material at, for example, 80°–100° C., before subjecting it to the heating at 150° C. or higher.

The heating at 150° C. or higher will normally be at a temperature in the range 160°–250° C. especially 180°–230° C. The heating may take the form of a baking, e.g. a few minutes at around 200° C., or a treatment in high temperature steam, e.g. around 10 minutes in steam at 180° C.

After the heating, the coloured textile may be subjected to usual washing treatments.

A preferred form of the process of the present invention comprises applying urea with the dyestuff or its precursors. The amounts of urea will usually be from 10 to 30% by weight of the aqueous composition used to apply the dyestuff or precursors to the textile material.

The presence of the urea often results in improved depth of colouration.

Whilst not usually as effective as urea, dicyandiamide, for example at levels of 1–3% by weight, will also produce improved depth of colouration when included in the composition applied to the textile material.

The process of the present invention is particularly valuable for colouring the cellulose component of a polyester/cellulose union. A disperse dyestuff to colour the polyester may be included in the dye liquor or print paste for use in the process of the present invention. The conditions of heating given above for the process of the present invention are also usually appropriate to facilitate the colouration of the polyester by the disperse dye. Both components of the union are thereby coloured by application of a single mixed dye liquor or print paste and fixed by the same heat treatment.

This process of colouration of polyester/cellulose unions is a further feature of the present invention. It has the merit that a single application of dyestuffs from the same medium is possible. With conventional reactive dyestuffs it is usually necessary to have two or more separate compositions applied to the union since attempts to include the reactive dyestuff, acid-binding agent and disperse dyestuff in a single medium results in flocculation or degradation of the disperse dye leading to inadequate colouration of the polyester component.

The process of the present invention is also of value for colouring wool/cellulose unions since good colouration of both components is possible without resorting to alkaline conditions with deleterious effects on the wool component.

The process of the present invention may be applied to a wide variety of unions since the colouration conditions for various components are similar.

The present invention is illustrated by the following Examples in which parts are by weight.

EXAMPLE 1

Print pastes are prepared with the composition given in the following Table:

|  | 1 | 2 | 3 | 4 | 5 | 6 | 7 | 8 | 9 |
|---|---|---|---|---|---|---|---|---|---|
| Dyestuff | 5 | 5 | 5 | 5 | 5 | 5 | 5 | 5 | 5 |
| Water | 45 | 25 | 43 | 23 | 44.5 | 24.5 | 42.5 | 22.5 | 22 |
| Manutex F (alginate thickener 10% aqueous soln.) | 50 | 50 | 50 | 50 | 50 | 50 | 50 | 50 | 50 |
| Urea | — | 20 | — | 20 | — | 20 | — | 20 | 20 |
| Nicotinic acid | — | — | — | — | 0.5 | 0.5 | 0.5 | 0.5 | 1 |
| Dicyandiamide | — | — | 2 | 2 | — | — | 2 | 2 | 2 |

The dyestuff has the structure (in free acid form):

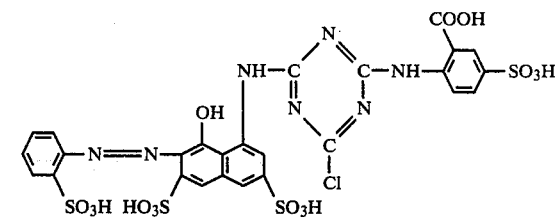

The print pastes are applied to mercerised cotton fabric in stripes by roller printing. The printed fabrics are divided and one portion baked for 1 minute at 200° C. and the other steamed at 180° C. for 10 minutes.

The prints are washed in boiling non-ionic detergent, rinsed and dried.

The colouration is higher with the steamed fabrics.

Pastes 1 to 4 give only a moderate red colouration, pastes 5 and 7 give more colouration and pastes 6, 8 and 9 give deep colouration.

The print pastes have good stability (usually greater than 28 days) and the prints have good wash resistance.

EXAMPLE 2

Print pastes are prepared with the composition given in the following Table:

|  | 1 | 2 | 3 | 4 |
|---|---|---|---|---|
| Dyestuff | 5 | 5 | 5 | 5 |
| Water | 45 | 25 | 43 | 23 |
| Urea | — | 20 | — | 20 |
| Manutex F (10% soln.) | 50 | 50 | 50 | 50 |
| Dicyandiamide | — | — | 2 | 2 |

The dyestuff has the structure (in the free acid form):

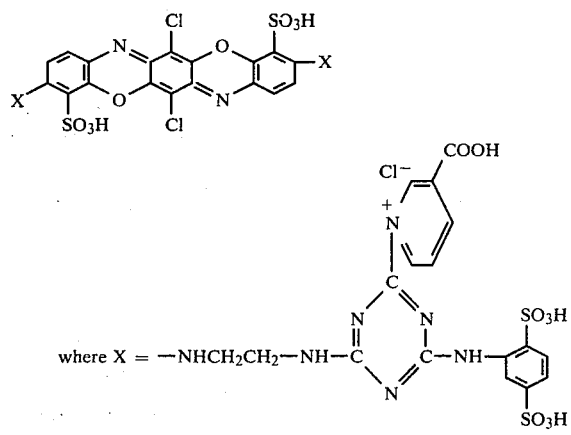

where X = —NHCH₂CH₂—NH—

The print pastes are applied to mercerised cotton and fixed as described in Example 1.

The prints are a bright blue shade, paste 3 gives somewhat deeper colouration than paste 1 and pastes 2 and 4 a much deeper colouration.

EXAMPLE 3

A print paste is prepared of the following composition:

| | |
|---|---|
| DISPERSOL Blue R-PC (a commercially available disperse dye) | 2.5 |
| DISPERSOL Yellow 7G-PC (a commercially available disperse dye) | 2.5 |
| Dye A | 1.25 |
| Dye B | 1.25 |
| Water | 22 |
| Manutex (10% soln.) | 50 |
| Urea | 20 |
| Nicotinic acid | 0.5 |

Dye A is a blue dye of the structure (in the free acid form):

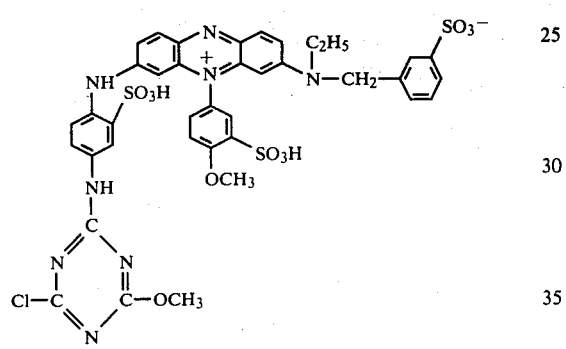

Dye B is a yellow dye of the structure (in the free acid form):

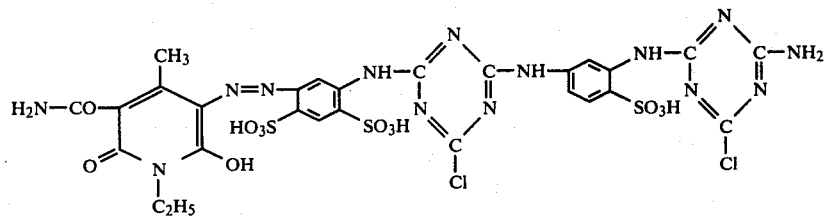

When applied to a union fabric (67% polyethylene terephthalate/33% cotton) and fixed as described in Example 1 a bright green print is formed.

Using a similar print paste in which the urea and nicotinic acid are replaced by 1 part of sodium bicarbonate and 20 parts of water, the resulting prints were dull and "grainy".

EXAMPLES 4-14

Print pastes are prepared according to composition No. 8 in Example 1 using following monochlortriazinyl reactive dyestuffs. When applied as described in that Example they yield prints of good yield in the following shades.

EXAMPLE 4

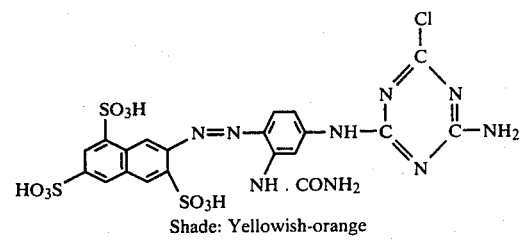

Shade: Yellowish-orange

EXAMPLE 5

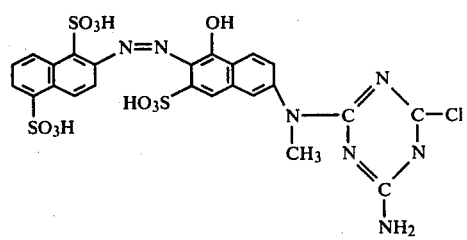

Shade: Orange

EXAMPLE 6

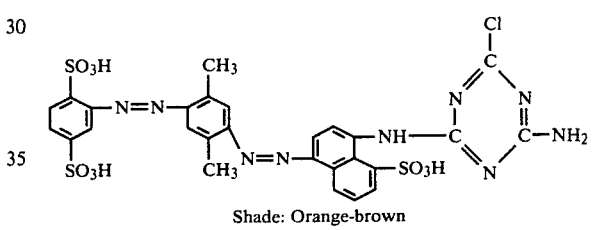

Shade: Orange-brown

EXAMPLE 7

Copper complex of

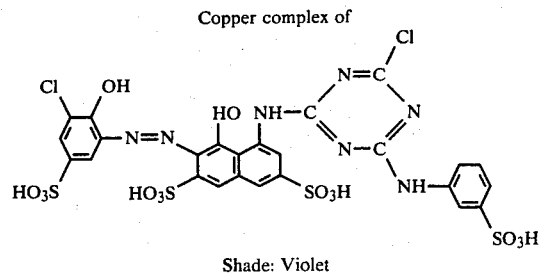

Shade: Violet

EXAMPLE 8

Copper complex of

-continued

[Structure: naphthalene with OH, OH, SO₃H, SO₃H, azo linkage to phenol with OH, connected via NH–C to chlorotriazine ring, then NH to phenyl-SO₃H]

Shade: Rubine

EXAMPLE 9

2:1 chromium complex of

[Structure: phenyl with CO₂H, azo group, naphthalene with OH and HO₃S, NH–C to chlorotriazine, C–NH to phenyl-SO₃H linked CH=CH to phenyl with SO₃H and NO₂]

Shade: Brown

EXAMPLE 10

[Structure: phenyl with SO₃H and CH₃O, azo, naphthalene with OH and HO₃S, N(CH₃)–C to chlorotriazine, C–NH to phenyl-SO₃H]

Shade: Scarlet

EXAMPLE 11

$$\left[ HO_3S\text{-phenyl-}NH-C\overset{N}{\underset{N}{=}}C-NH\text{-phenyl(SO}_3\text{H)}-N=N- \right]_2 X$$

where X is

[Structure: naphthalene with OH, NH₂, HO₃S, SO₃H, CH₃ groups]

Shade: Green

EXAMPLE 12

A mixture of 20 parts of the dye of Example 7 and 80 parts of $$\left[ HO_3S\text{-phenyl-}NH-C\overset{N}{\underset{N}{=}}C-NH\text{-phenyl-}N=N- \atop SO_3H \right]_2 X$$

where X is

[Structure: naphthalene with OH, NH₂, HO₃S, SO₃H, CH₃ groups]

Shade: Navy Blue

EXAMPLE 13

[Structure: phenyl with SO₃H, azo, naphthalene with OH, HO₃S, SO₃H, NH linked to chlorotriazine, C–NH to phenyl with SO₃H and COOH]

Shade: Red

EXAMPLE 14

[Structure: naphthalene with SO₃H, azo, naphthalene with OH, HO₃S, SO₃H, NH linked to chlorotriazine with Cl, C–NH to phenyl with SO₃H and COOH]

Shade: Red

EXAMPLE 15

Following the procedure used for Example 1, Composition 8, using the following dye, prints are obtained having a moderate red colour yield.

[Structure: CH₃O-phenyl(SO₃H)-N=N-naphthalene(OH, HO₃S)-N(CH₃)-C to dichlorotriazine ring with two Cl groups]

EXAMPLES 16–18

The compositions used in Examples 2, 4 and 13 are printed onto VIYELLA fabric W22 (a 47% cotton/53% chlorinated wool blend) and steamed for 6 minutes at 170° C. The prints are washed in cold water, water at 60° C. and treated for 5 minutes in a solution of 0.2% ammonia and 0.2% SYNPERONIC BD (a non-ionic detergent) at 50° C. Good colour yields are obtained.

Steaming at lower temperatures e.g. 130° or 150° C. gives somewhat lower yields.

EXAMPLES 19-27

A print paste is prepared according to the composition given in Example 3 replacing the disperse dyes with those listed below and replacing Dyes A and B with the monochlorotriazinyl reactive dyes given below and adding 2 parts of dicyandiamide. The water level being adjusted to give a total of print paste of 100 parts.

The pastes are printed on a 67/33 polyester/cotton and fixed by heating to 200° C. for 1 minute or by steaming at 180° C. for 6 minutes.

The prints are washed by rinsing in cold water, treating in 0.2% caustic soda at 85° C. for 2½ minutes, boiling in water and rinsing in cold water.

| Example | Disperse Dye | Reactive Dye | Colour of print |
|---|---|---|---|
| 19 | Dispersol Yellow 7G PC (5 parts) | As Dye B in Example 3 (2.5 parts) | Yellow |
| 20 | Dispersol Blue 5G-PC (5 parts) | As Example 2 (2.5 parts) | Blue |
| 21 | Dispersol Red 2B-PC (5 parts) | As Example 13 (2.5 parts) | Red |
| 22 | Dispersol Navy 2R-PC (10 parts) | Mixture as Example 12 (5 parts) | Navy-blue |
| 23 | Dispersol Rubine 3B-PC (5 parts) | As Example 7 (1.25 parts) As Example 13 (1.25 parts) | Rubine |
| 24 | Dispersol Orange G-PC (5 parts) | As Example 4 (2.5 parts) | Orange |
| 25 | 5 parts Disperol Orange G-PC plus 2.5 parts of the following: | | |

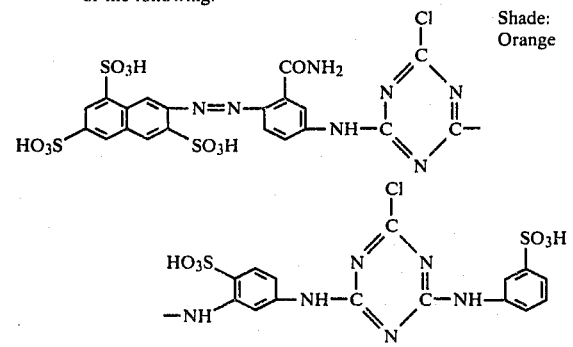

Shade: Orange 26  15 parts Disperol Black 2R-PC plus 6.7 parts of the following:
Mixed 1:2 chromium and cobalt complexes

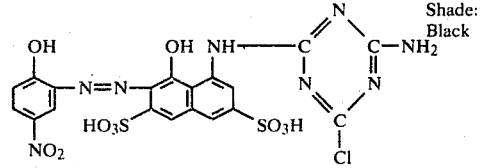

Shade: Black 27  15 parts Dispersol Black 2R-PC plus 7.5 parts of the following mixture:
65% As Example 2 with X as

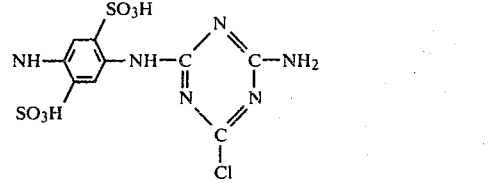

20% As in Example 4

15%

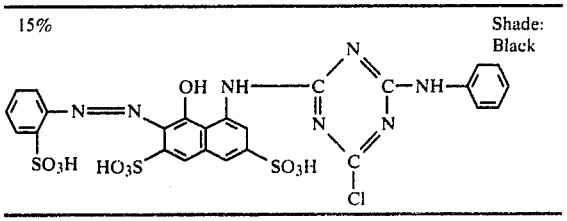

Shade: Black

All the prints have good colour yield at least equal to those from similar print pastes in which the nicotinic acid and dicyandiamide are replaced by 1 part of sodium bicarbonate.

I claim:

1. A process for the colouration of cellulose or wool textile materials which comprises applying a dyestuff containing one or more s-triazinyl groups bearing a quaternary nitrogen substituent, or the precursors of such a dyestuff, in the absence of an acid-binding agent and heating the treated textile material to 150° C. or higher to fix the dyestuff to the cellulose or wool, the dyestuff being selected from the group consisting of (a) dyestuffs of the formula:

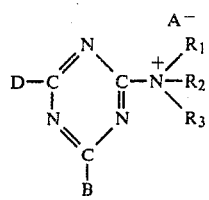

where D is a chromophoric group; A is Cl, Br or F; B is a substituent unreactive to cellulose and

is derived from a tertiary amine selected from trimethylamine, triethylene diamine, pyridine, a methyl pyridine or a carboxy pyridine of the formula:

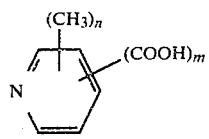

where $n=0$ or 1 and $m=1$ or 2, and (b) dyestuffs derived from a halotriazinyl dyestuff of the formula:

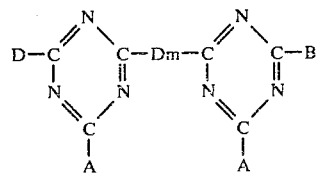

where A, B and D have the meanings given above and Dm is a diamine residue linking the triazine nuclei by its two amino groups, and from a tertiary amine as defined for dyestuff (a).

2. A process as claimed in claim 1 in which the heating is carried out at 180° to 230° C.

3. A process as claimed in claim 1 in which urea is applied with the dyestuff.

4. A process as claimed in claim 1 in which dicyandiamide is applied with the dyestuff.

5. A process as claimed in claim 1 in which the textile material is cellulose.

6. A process as claimed in claim 1 when used to colour the cellulose component of a polyester/cellulose union.

7. A process as claimed in claim 1 when used to colour a wool/cellulose union.

* * * * *